Figure 1:
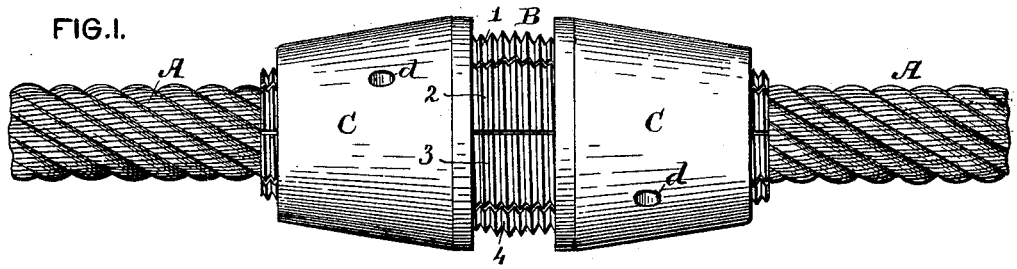

(No Model.)

J. H. BOWDEN.
CABLE COUPLING AND GRIP DEVICE.

No. 391,226. Patented Oct. 16, 1888.

WITNESSES,
J. Henry Kaiser
Victor J. Evans.

INVENTOR,
James H. Bowden
By J. N. McIntire
Att'y.

N. PETERS, Photo-Lithographer, Washington, D. C.

UNITED STATES PATENT OFFICE.

JAMES H. BOWDEN, OF WILKES-BARRÉ, PENNSYLVANIA.

CABLE-COUPLING AND GRIP DEVICE.

SPECIFICATION forming part of Letters Patent No. 391,226, dated October 16, 1888.

Application filed July 28, 1888. Serial No. 281,338. (No model.)

*To all whom it may concern:*

Be it known that I, JAMES H. BOWDEN, of Wilkes-Barré, in the county of Luzerne and State of Pennsylvania, have invented a new and useful Improved Cable-Coupling and Grip Device; and I do hereby declare that the following is a full, clear, and exact description thereof, reference being had to the accompanying drawings, making part of this application.

Previous to my invention various devices and contrivances have been devised and employed designed to be securely but removably clamped upon or round about wire cables or ropes, both for the purpose of affording means for the attachment of some suitable grip or carrier device and for the purpose of effecting a reliable connection or union between the two separate pieces, or the ends of a single piece (of cable) arranged adjacently and in line; but in all such devices or contrivances, so far as my knowledge extends, more or less difficulty and imperfection in the mode of operation and effects of the device have arisen from the fact that none of the contrivances have possessed the capacity to grip the cable with sufficient force to avoid the possibility of either slipping longitudinally or in a helical or spiral direction thereon, or to grip the cable in such manner as that when subjected to draft strain all the strands or wires of the cable would be subjected to the same degree of strain in the effort for disengagement from the cable of the gripping device. Such devices or contrivances have also been frequently employed for the purpose of securing some suitable device to one end of a rope or cable for the attachment of any weight to be lifted, or for the application of the draft-power to the cable, and in such applications of said device the same difficulties and imperfections have been encountered.

I propose by my invention to provide for use a device or contrivance for the above-mentioned purposes the principle of construction and mode of operation of which shall be such that in the various forms in which it may be applied to the cable the latter will not only be gripped with sufficient and the maximum degree of force, but also in such manner that under any strain tending to either cause the cable to slip within the grip of the said device or tending to cause the separation of two ends of a cable when the device may be used as a splice all the separate strands of the cable will be subjected to practically the same tensional strain under the gripping influence of said device; and to these main ends and objects my invention may be said to consist, essentially, in a splicing or gripping device for cables composed of a series of radially-arranged separate metallic pieces which at their contacting surfaces with the cable are molded or otherwise shaped to conform to the peripheral shape and interstices of the cable, and having their external surfaces lying in a tapering or conical surface, in combination with a tapering or frustuminally-shaped surrounding band or ring, the internal surface of said band or ring and the external surfaces of the combined pieces which surround the cable being threaded to engage with each other in such manner that by a movement in one direction or the other of the threaded band or collar the said rope-surrounding devices will be either forced to grip the surrounded cable or to release their clamping action thereon, as may be desired, all as will be hereinafter more fully explained, and as will be more particularly pointed out and specifically defined in the claim of this specification.

To enable those skilled in the art to which my invention relates to make and use the same, I will now proceed to more fully describe it, referring by letter to the accompanying drawings, in which I have shown my invention carried out in those forms in which I have so far successfully practiced it, though modifications thereof may, of course, be made as circumstances may require without changing the principle of construction or mode of operation of my improved contrivance.

Figure 2:
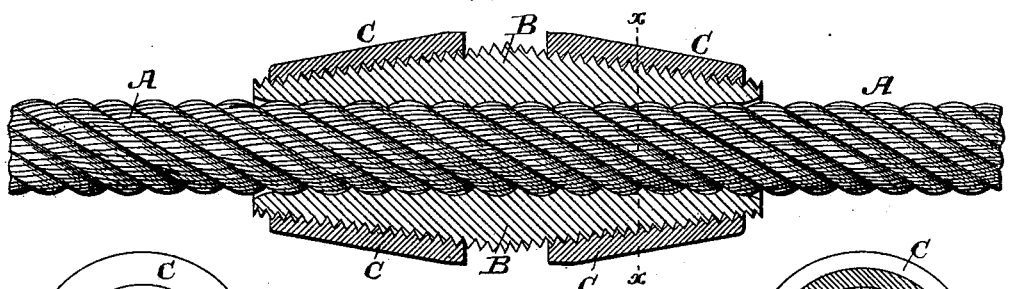
Figure 3:
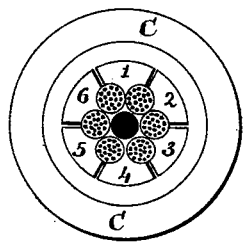
Figure 4:
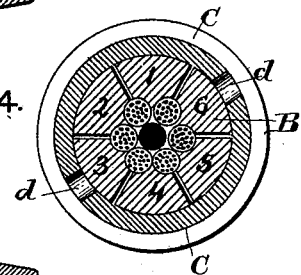
Figure 5:
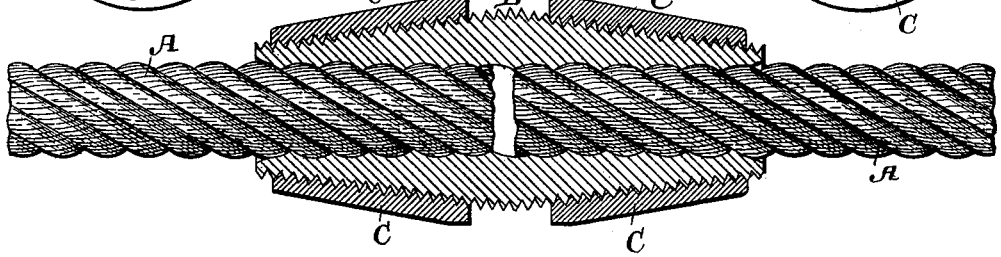
Figure 6:
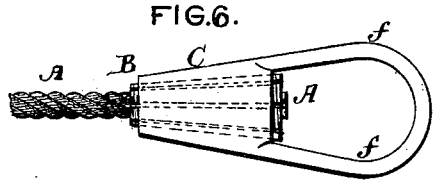
Figure 7:
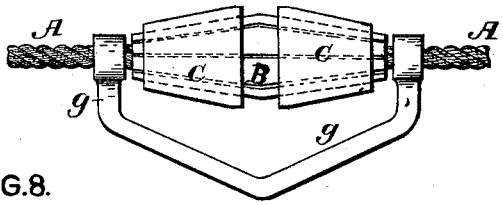
Figure 8:
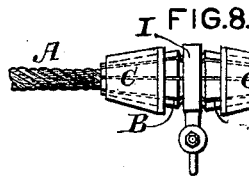

In the drawings, Figure 1 is a side view or elevation showing a piece of wire cable having applied thereto a gripping device made according to my invention and adapted to the purposes of either a sprocket device or for the attachment of any suitable carrier device. Fig. 2 is a vertical central section of the devices shown in elevation at Fig. 1. Fig. 3 is an end view of the same, and Fig. 4 is a cross-sectional view taken at the line *x x* of Fig. 2. Fig. 5 is a sectional view similar to Fig. 2, and showing substantially the same gripping device or contrivance, but showing the cable in two separate pieces, or as having the ends of one piece of cable arranged adjacently and the gripping device adapted to perform the function of a splicing contrivance. Fig. 6 is a side view or elevation drawn on a smaller scale and showing the application of my invention to a gripping device applied to one end of a cable for the purpose of lifting loads or for the attachment to one end of a cable of any suitable device to which it may be desired to supply the draft-strain of a cable. Fig. 7 is a side view or elevation on the same scale as Fig. 6, and showing, in connection with portion of a cable, a gripping device similar to that shown at Fig. 1, but supplemented with an attachment adapted to act as a carrier device or for coupling the cable with any contrivance with which it may be desired to make a connection. Fig. 8 is an elevation or side view on a somewhat smaller scale still, showing in connection with a cable a gripping device substantially like that seen at Fig. 7, but having combined with it another form of attachment or pendant for connection with any device with which it may be desired to couple the cable when the latter may be either a motor or may be actuated by some motive device.

In the several figures the same parts, wherever they are duplicated, will be found designated by the same letters of reference.

A represents an ordinary wire cable, which in the case shown is composed of one central strand or core and six circumferentially-arranged strands, which encompass the central core spirally in the usual manner, said central core being made either of metallic strands or wires, or of hemp, as may be desired.

B represents the cable encircling and gripping device, which is composed of a number of pieces, (in the present case six in number,) each numbered from 1 to 6, inclusive. (see Figs. 1, 3, and 4,) while C represents a frustuminally-shaped or tapering collar or band adapted to surround and engage with the peripheral surface of the six-part rope-gripping device proper, B, in a manner which will be presently explained.

As clearly shown, the six pieces marked from 1 to 6, inclusive, comprising the device B, are so constructed and arranged when properly in place round about the cable as that they come nearly into contact at the radial planes of their adjacent surfaces, while their circumferential portions constitute (with the exception of the case shown at Fig. 6) a figure which may be properly described as two conical frustums united at their bases, and these circumferential surfaces, as will be seen, are formed or provided with a continuous screw-thread, with which engage similar threads formed interiorly of each of the surrounding or embracing bands or collars C. (See Figs. 1 to 5, inclusive.) Those surfaces of the parts 1 to 6 of the device B which come into contact with the surface of the cable A are molded or otherwise formed so as to perfectly fit or match to said cable-surface, or, in other words, are so shaped as to present surfaces which are the counterparts of those portions of the surface of the cable A with which said parts or pieces of the device B come into contact.

Each one of the bands or collars C may be provided with one or more holes or indentations, as seen, for instance, at $d$, or may be otherwise made, to facilitate the turning of them in either direction by the use of a spanner or other wrench-like device.

In the operation of a gripping device such as shown and so far described, the parts or pieces numbered 1 to 6 having been placed in juxtaposition relatively to the cable A and to each other, as illustrated at Figs. 1 to 5, inclusive, the screw collars or bands C are turned onto the ends of the doubly-tapered device B to about the positions illustrated in the drawings, whereby the aggregated parts of the device B are not only held in proper relative position, but are forced to move radially and forcibly into contact with the surrounded cable A to a degree proportionate to the extent to which the said tapering screw-collars C may be turned toward the largest diameter of the device B, or, in other words, toward each other; and each one of the pieces 1 to 6 having been molded or cast so that the surface thereof which is adjacent to the surface of the cable shall be a counterpart of said cable-surface, the gripping pressure to which the cable is subjected is such, it will be seen, that not only is any relative movement of the cable and the gripping device (by either a longitudinal or spiral movement) effectually prevented, but the gripping force is applied to the cable in such manner that every strand thereof is subjected to the same degree of pressure.

In the modification of my invention shown at Fig. 6 the device B, though in other respects similar to the corresponding device of the contrivance shown in the preceding figures, is frustuminal in shape, or tapers only in one direction, while only a single tapering collar or band C is employed instead of two, as in the cases shown in the preceding figures, the device shown in said Fig. 6 having the collar or band C formed or provided with a loop-like device, $f$, for purposes well understood.

In the modifications shown at Figs. 7 and 8 the gripping device proper corresponds substantially in form with that shown in Figs. 1 to 5, inclusive; but in Fig. 7 is supplemented with a depending loop-like device, $g$, while in Fig. 8 it has combined with it a carrier or pendent device, I, which is mounted to turn axially round about the central or body portion of the part B of the gripping device proper.

I have shown the portion B as composed of six pieces, and have found this number sufficient in the use of my improved contrivance in connection with a seven-strand wire cable substantially such as commonly used, and in which in each one of the six circumferentially-arranged strands a series of spirally-arranged exterior wires may be employed; but the number of parts or pieces comprising the portion B of the gripping device may be increased, if found expedient or necessary in view of the peripheral form or character of the cable with which the device is designed to be combined, the important essential being that the extent of surface with which each one of the parts of the device B comes in contact shall not be so great in the circumferential direction of the surface of the cable as to engender any difficulty in having the cable-surface and the adjacent surface of each one of the parts of the device B made to perfectly match or to be counterparts of each other. If deemed expedient to effectuate this important peculiarity of construction, each one of the pieces 1 to 6, inclusive, may be made and arranged in a spiral direction lengthwise of the cable, instead of the meeting surfaces of the pieces lying in planes which are coincident with the axial line of the cable.

Having now so fully explained the nature and operation of my improved grip device or contrivance that those skilled in the art can understand and practice my invention, what I claim as new, and desire to secure by Letters Patent, is—

A rope or cable gripping device or contrivance composed of a series of parts or pieces arranged and operating to embrace or surround the cable and to conform in shape at the vicinity of its embracing surface with the surface of the cable, having combined therewith one or more clasping or encircling bands or collars, the meeting surfaces of said collar or collars and said cable-surrounding pieces being tapering and provided with screw-threads adapted to engage with each other and operate in substantially the manner hereinbefore set forth.

In witness whereof I have hereunto set my hand this 20th day of July, 1888.

JAMES H. BOWDEN.

In presence of—
R. VAN A. NORRIS,
R. H. NICHOLSON.